United States Patent [19]

Ballard

[11] 4,111,675
[45] Sep. 5, 1978

[54] THERMAL TREATMENT OF GLASS IN A FLUIDIZED BED

[75] Inventor: Geoffrey Martin Ballard, St. Helens, England

[73] Assignee: Pilkington Brothers Limited, St. Helens, England

[21] Appl. No.: 802,450

[22] Filed: Jun. 1, 1977

[30] Foreign Application Priority Data

Jun. 10, 1976 [GB] United Kingdom ............... 24125/76

[51] Int. Cl.² .............................................. C03B 27/00
[52] U.S. Cl. ....................................... 65/114; 65/117; 65/348; 165/104 F
[58] Field of Search .......................... 65/114, 117, 348; 165/108 F

[56] References Cited

U.S. PATENT DOCUMENTS

| | | | |
|---|---|---|---|
| 2,759,710 | 8/1956 | Paille | 165/104 F X |
| 3,423,198 | 1/1969 | McMaster et al. | 65/114 X |

*Primary Examiner*—Arthur D. Kellogg
*Attorney, Agent, or Firm*—Burns, Doane, Swecker & Mathis

[57] ABSTRACT

Glass articles are thermally treated in a gas-fluidized bed of particulate material which is maintained in a quiescent uniformly expanded state of particulate fluidization. Heat exchange within the bed with the material of the bed regulates the bed temperature, and the heat exchange is enhanced by engendering agitation within the bed.

15 Claims, 7 Drawing Figures

THERMAL TREATMENT OF GLASS IN A FLUIDIZED BED

BACKGROUND OF THE INVENTION

1. Field of the Invention

This invention relates to the processing of material in a fluidised bed, and in particular to a method of operating a fluidised bed for use in processing an article which is immersed in the bed.

More particularly the invention relates to a method and apparatus for thermally treating a glass article, for example a glass sheet, in which the article is immersed in a gas-fluidised bed of particulate material which is maintained in a quiescent uniformly expanded state of particulate fluidisation. The thermal treatment of the glass sheet may be for annealing, thermally toughening or heating the sheet.

The invention is particularly applicable to a method and apparatus for thermally toughening a succession of flat glass sheets, or bent glass sheets such as those used singly as a motor vehicle windscreen or as part of a laminated motor vehicle windscreen, a side light or a rear light for a motor vehicle, or for use in construction of windscreen assemblies for aircraft and railway locomotives.

2. Description of the Prior Art

In U.S. patent application Ser. No. 717171, filed 24th Aug. 1976, now abandoned the disclosure of which is incorporated herein by reference, there is described a method of thermally treating glass in which the hot glass is immersed in a fluidised bed of particulate material. Prior to immersion of the glass the fluidised bed is in a quiescent uniformly expanded state of particulate fluidisation. By using this method a successful commercial yield of whole glass sheets is achieved, there being very few fractures of the glass sheets while the toughening stresses are being developed in the sheets.

When thermally toughening a succession of glass sheets, which may be flat or bent, each sheet is previously heated in known manner to a temperature above the strain point of the glass and usually to a temperature near to the softening point of the glass, for example a temperature in the range 610° C. to 670° C. when toughening soda-lime-silica glass. Each hot glass sheet is suspended from tongs and is immersed in the fluidised bed and toughening stresses are induced in the glass as it cools in the fluidised bed. In order to achieve a consistent degree of toughening of a succession of glass sheets it is desirable to maintain the fluidised bed at a constant temperature, for example at a temperature in the range 40° C. to 150° C., and more usually in the range 40° C. to 70° C.

Further in commercial operation it is desirable to process a succession of glass sheets in rapid sequence and the thermal toughening of one glass sheet every 60 seconds is typical. This means that there is a large input of heat to the particulate material of the fluidised bed.

It has already been proposed to cool a fluidised bed of the freely bubbling type used for the processing of glass sheets, by the provision of water cooled coils immersed in the bed. Such coils are effective in removing heat from the fluidised bed because of the high rapidity of particulate movement and the high degree of particle mixing which occurs in such a freely bubbling fluidised bed.

We have found that the use of such cooling coils is not sufficiently effective for regulating the temperature of a fluidised bed of particulate material which is maintained in a quiescent uniformly expanded state of particulate fluidisation, and which is being used for the processing of a succession of glass articles.

In the case of such a fluidised bed for use in the thermal treatment of, for example, glass sheets, the cooling coils have to be placed at positions where they will not interfere with the entry of glass sheets into the bed, for instance around the sides of the bed. This places a limitation on the number of cooling coils which can be fitted in the bed and thus limits the degree of cooling which can be achieved.

It is a main object of the present invention to provide an improved method and apparatus for operating a fluidised bed, in particular for regulating the temperature of a fluidised bed which is in a quiescent uniformly expanded state of particulate fluidisation.

SUMMARY

The invention provides a method of operating a fluidised bed for use in the processing of articles which are immersed in the bed. The articles are immersed in a gas-fluidised bed of particulate material which is maintained in a quiescent uniformly expanded state of particulate fluidisation, and the temperature of the fluidised bed is regulated by heat exchange within the bed with the particulate material of the bed and agitation engendered within the bed to enhance said heat exchange.

Preferably agitation within the bed is engendered between immersion of successive articles in the bed.

The invention further provides a method of thermally treating a glass article comprising immersing the article in a gas-fluidised bed of particulate material which is maintained in a quiescent uniformly expanded state of particulate fluidisation, regulating the temperature of the fluidised bed by heat exchange with the particulate material at least in a localised region of the fluidised bed, and, between immersion of successive articles in the bed, agitating the fluidised bed at least in that region to enhance said heat exchange.

This agitation of the bed engenders an increased rapidity of particle movement and particle mixing.

Agitation in the localised region of the fluidised bed may be effected mechanically by means of stirrers such as paddles or propellers.

In a preferred method agitation of the particulate material is effected by bubbling gas into the localised region of the fluidised bed at a rate to effect localised bubbling of the particulate material in said region and thereby facilitate said heat exchange.

Agitation of the localised region of the fluidised bed may be carried out continuously during thermal treatment of a succession of glass articles.

The thermal treatment of the glass article, for example a glass sheet, may be thermal toughening or annealing both of which involve cooling of the glass and extraction of heat from the fluidised bed, although for annealing the glass the temperature of the fluidised bed would usually be higher than the temperature employed when thermally toughening the glass.

The bed may also be employed for heating glass articles and the heat exchange with the particulate material may, in this instance, involve the addition of heat to the particulate material to compensate for that heat employed in heating the glass articles to a required temperature.

When either heating or cooling the particulate material the local agitation of the bed material in the region where heat exchange is taking place, ensures efficient heat exchange with the whole of the bed without substantially interfering with the quiescent uniformly expanded state of particulate fluidisation of that part of the bed in which the glass sheet is immersed.

The invention is particularly applicable to the thermal toughening of a succession of hot glass sheets and from this aspect provides a method comprising cooling the fluidised bed by circulating cooling fluid through an enclosed path in heat exchange relationship with the fluidised material, and, between immersion of successive glass sheets in the bed, engendering agitation within the bed to enhance said heat exchange.

It is desirable that the central part of the bed, in which part the glass sheets are immersed, should be free from any obstruction throughout the whole operating cycle, and a preferred method comprises circulating cooling fluid through an enclosed path at the periphery of the fluidised bed away from the central part of the bed in which the hot glass sheet is immersed, and maintaining a quiescent state of fluidisation of the central part of the bed while causing localised agitation of the particulate material in the region of the enclosed path.

Preferably cooling fluid is circulated in heat exchange relationship with the fluidised particulate material on all sides of said central part of the bed. This ensures complete uniformity of extraction of heat around the whole of the particulate material in the central part of the bed in which the glass sheet is immersed.

Still further according to the invention the fluidised bed may be in a container of rectangular horizontal cross-section and cooling fluid is circulated through an enclosed path at each side of said cross-section to facilitate heat extraction from all sides of the fluidised bed.

When thermally toughening hot glass sheets the top of the fluidised bed, being contacted first by the hot glass sheets, tends to become heated up as the processing of a succession of sheets continues. In order to provide auxiliary heat extraction from the top of the bed the invention additionally comprises extracting heat from the top of the fluidised bed by circulating cooling fluid through an enclosed path in heat exchange relationship with the whole of the top of the bed, and causing localised agitation of material to effect an increased rapidity of particle movement and particle mixing at the top of the bed to enhance heat exchange while maintaining said quiescent state of fluidisation in the lower part of the bed.

Further the invention comprehends apparatus for thermally treating a glass article, comprising a tank for containing a fluidised bed of particulate material, gas supply means at the bottom of the tank for maintaining a quiescent uniformly expanded state of particulate fluidisation of the bed, heat exchange means located in the tank, and agitator means mounted in the tank adjacent the heat exchange means for causing localised agitation in the particulate material contacting the heat exchange means.

In a preferred apparatus for the thermal toughening of flat or bent glass sheets, the tank is of rectangular horizontal cross-section, the heat exchange means comprises at least one bank of cooling pipes mounted in the tank adjacent a wall of the tank, and the agitator means comprises gas supply means in the region of the bottom of the bank of cooling pipes.

Preferably there is a bank of cooling pipes with an associated gas supply pipe adjacent each wall of the tank. From this aspect the invention provides a plurality of banks of cooling pipes which are respectively adjacent the walls of the tank, with a gas supply pipe in the region of the bottom of each bank of cooling pipes. Each bank of cooling pipes may comprise a single row of cooling pipes. Alternatively each bank may comprise two or three rows of cooling pipes which are mounted close together adjacent the inside of the corresponding tank side wall so as to leave as much clear space in the central part of the tank as possible.

For extracting heat from the top of the fluidised bed the heat exchange means may include an array of cooling pipes arranged to be lowered into the top of the tank, and the gas supply means may comprise gas supply pipes carried by the heat exchange means at the bottom of the array of cooling pipes and having outlets distributed over the whole region of the bottom of the array.

In a preferred embodiment this array of cooling pipes is carried beneath a lid for the tank, which lid is pivotally mounted for lowering on to the top of the tank thereby inserting the array of cooling pipes into the tank.

The invention also includes a sheet of glass which has been thermally treated by the method of the invention, in particular a thermally toughened glass sheet produced by the method of the invention.

BRIEF DESCRIPTION OF THE DRAWINGS

Some embodiments of the invention will now be described, by way of example, with reference to the accompanying drawings in which.

DESCRIPTION OF THE PREFERRED EMBODIMENTS

Figure 1:
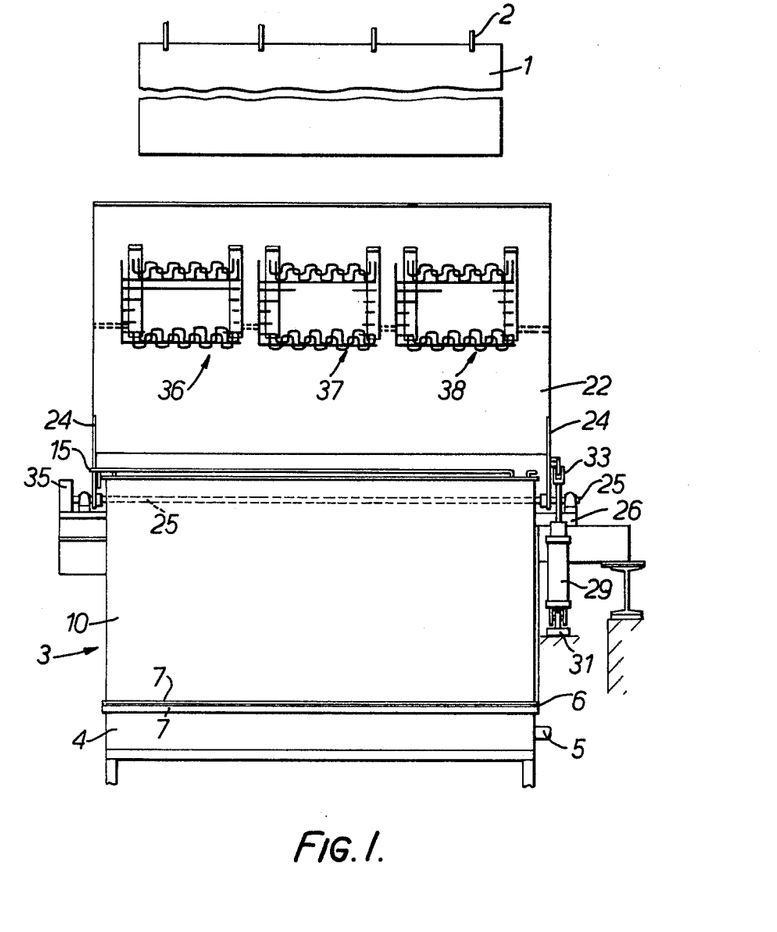
FIG. 1 is a front elevation of apparatus according to the invention for thermally treating a glass sheet by immersing the sheet in a fluidised bed which has cooling pipes and associated gas supply pipes.

Referring to the drawings, FIG. 1 shows a front elevation of apparatus according to the invention for thermally toughening a glass sheet. A glass sheet 1 to be toughened is suspended by tongs indicated at 2 from a tong bar, not shown, which carries glass sheets in succession through a heating furnace to the toughening station where the apparatus of FIG. 1 is located. Each sheet is quenched in turn by being lowered into a gas-fluidised bed of particulate material which is in a quiescent uniformly expanded state of particulate fluidisation and is contained in a deep tank 3 of rectangular horizontal cross section. The particulate material which constitutes the fluidised bed is an inert refractory material, for example γ alumina of particle size in the range 20 μm to 160 μm, the mean particle size being about 60 μm. A plenum chamber 4 is mounted beneath the bottom of the tank 3 and this chamber is supplied with fluidising gas, usually air, under pressure through a duct 5. A microporous membrane 6 extends across the base of the tank 3 between the tank and the plenum chamber 4. The edges of the membrane 6 are clamped between a flange 7 extending around the top of the plenum chamber. The membrane is constructed as described in U.S. patent application Ser. No. 717171, now abandoned, the disclosure of which is incorporated herein by reference, and consists of a number of layers of strong micro-porous paper which are laid on a perforated steel plate having a regular distribution of holes drilled in the plate. A woven wire mesh, for example stainless steel mesh is laid on top of the paper. There is a high pressure drop across the uniformly micro-porous membrane 6 which pressure drop may for example be in excess of 60% of the plenum pressure. This provides a uniform distribution of fluidising gas flowing upwardly from the upper face of the membrane in the tank 3. The high pressure drop across the membrane makes possible, by control of the plenum pressure in the plenum chamber 4, sensitive regulation of the velocity of upward gas flow through the particulate material. The particulate material, in this example γ-alumina is placed in a quiescent uniformly expanded state of particulate fluidisation through control of the plenum pressure such that the gas velocity through the bed is between that velocity corresponding to incipient fluidisation, and that velocity corresponding to maximum expansion of the bed in which dense-phase fluidisation is maintained. The particulate material in the tank 3 is thus readily maintained in a quiescent uniformly expanded state of particulate fluidisation which state has been found to be advantageous in producing adequate stresses in the glass while substantially avoiding loss of glass sheets due to fracture in the bed.

Figure 3:
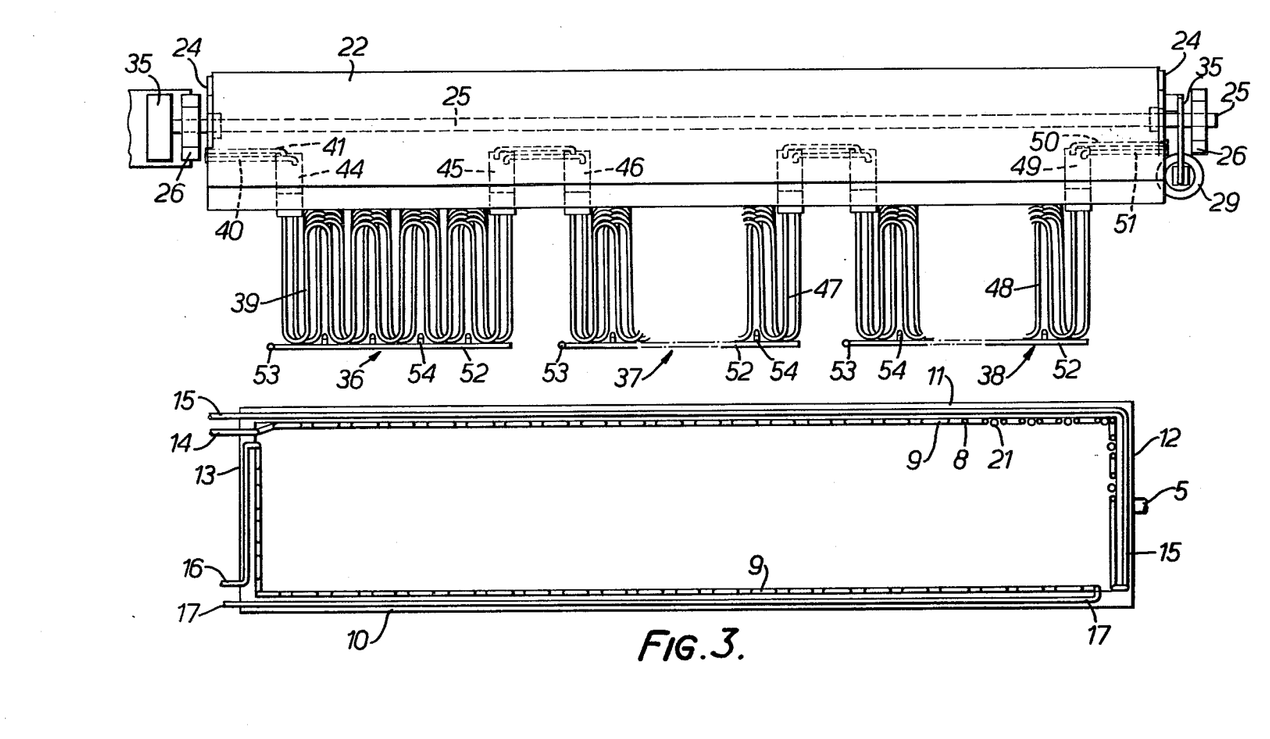
FIG. 3 is a plan view of the apparatus of FIGS. 1 and 2.

The temperature of the fluidised bed in the tank 3 is regulated by heat exchange with the particulate material in a region of the fluidised bed around the tank walls so as to leave unobstructed the central part of the fluidised bed in which the hot glass sheets 1 are immersed. The depth of the bed in the tank 3 is sufficient to permit complete immersion of all the usual sizes of glass sheets being toughened in particular sheets cut and bent to the shape of motor vehicle windscreens. Also the rectangular horizontal cross-section of the tank illustrated in FIG. 3 is sufficient to accommodate all shapes of glass sheets to be toughened.

The heat exchange means comprises a plurality of banks of vertical cooling pipes which are mounted in the tank 3 adjacent to inner surfaces of the walls of the tank. Each bank of cooling pipes comprises a number of vertical pipes 8 which are connected in series by U-shaped end adapters 9. The pipes are fixed to the side walls of the tank structure by fixing brackets which are omitted for clarity.

The tank 3 has longer side walls 10 and 11 and shorter end walls 12 and 13. The bank of vertical cooling pipes 8 mounted along the inside of the wall 11 is supplied with cooling water at one end through an inlet pipe 14. This bank of pipes is connected in series with a similar bank of vertical cooling pipes adjacent the end wall 12, and an outlet pipe 15 for the cooling water bleeds away from the far end of the wall 12 to a position adjacent the inlet pipe 14. Similarly cooling water is supplied through an inlet pipe 16 to one end of the bank of vertical cooling pipes adjacent the end wall 13, which bank is connected in series with the bank of cooling pipes mounted adjacent the side wall 10. An outlet pipe 17 extends along the top of the tank close to the wall 10 from the far end of that wall to a position adjacent the inlet pipe 16. The flow of cooling water through the banks of vertical cooling pipes which are respectively adjacent the walls of the tank can therefore be closely regulated from a position adjacent one of the ends of the tank 3.

In order to facilitate the heat exchange between the cooling pipes 8 and the particulate material in the region of the walls of the tank, gas is bubbled into the fluidised material in the region of the enclosed path constituted by the banks of vertical pipes 8 joined by their end adapters 9, at a rate to effect localised bubbling fluidisation of the particulate material which is in contact with the pipes.

Figure 2:
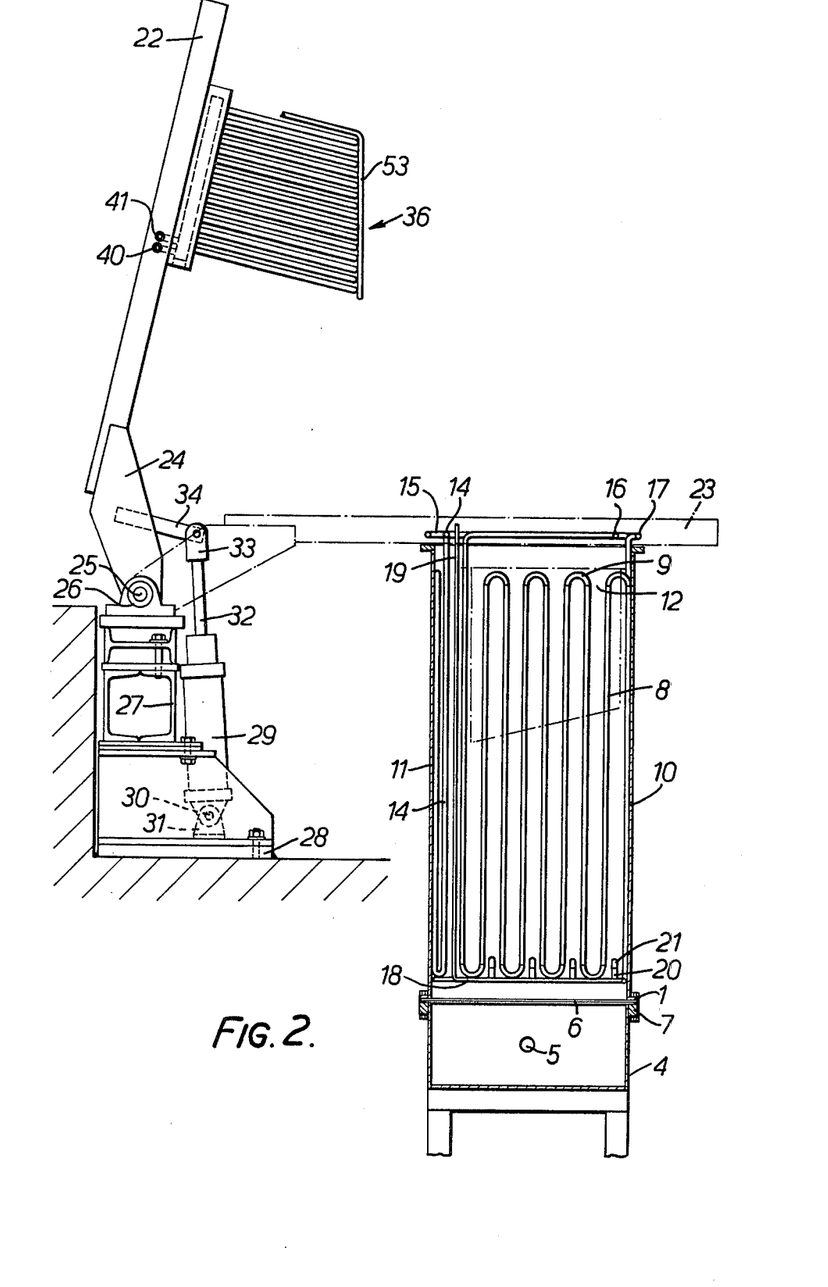
FIG. 2 is a side view, partly in section, of the apparatus of FIG. 1.

To effect this localised bubbling fluidisation gas supply means, in the form of gas supply pipes, is mounted in the tank adjacent the heat exchange means constituted by the cooling pipes 8. A gas supply pipe is provided in the region of the bottom of each of the banks of cooling pipes and one such gas supply pipe 18 is illustrated in FIG. 2. The pipe 18 is welded to the end adapters 9 at the bottom of the bank of vertical cooling pipes 8 which is illustrated. A gas supply inlet pipe 19 is connected to the supply pipe 18 and the pipe 19 extends upwardly through the top of the tank. There are upwardly extending air outlet branches 20 spaced along the pipe 18. Each of the branches 20 is fitted with a dome-shaped cap 21 of permeable material. The branches 20 are located in the free spaces between the cooling pipes at the bottom of the bank. Alternatively each of the outlet branches may be a double outlet having two dome-shaped caps 21 which are spaced apart to either side of the cooling pipes to provide greater uniformity of upward bubbling over both sides of the cooling pipes.

The gas supply pipe 18 extends right around the bottom of the tank below all the banks of vertical cooling pipes and the far end of the pipe 18 which returns back adjacent the air inlet pipe 19, is closed. Fluidising gas, usually air, is supplied under pressure through the inlet pipe 19 and air bubbles vigorously through the permeable caps 21, being supplied at a rate to ensure bubbling fluidisation of the particulate material right around a region adjacent the side walls of the tank.

Because of the localised bubbling gas supply, this heat exchange region does not substantially interfere with maintenance, through uniform upward flow of fluidising gas through the porous membrane 6, of the quiescent state of uniformly expanded fluidisation in the main central part of the bed in which the glass sheets are immersed. The localised bubbling may be carried out continuously during toughening of a succession of glass sheets.

It may be desirable, however, to effect localised bubbling fluidisation to facilitate heat extraction from the particulate material only in the time intervals between the treatment in the bed of successive glass sheets. To this end the supply of air to the gas supply pipe 18 is switched off just before a glass sheet is immersed in the bed in order to ensure that the bed has attained the quiescent uniformly expanded state of particulate fluidisation by the time the glass sheet is immersed in the bed. This is especially important when toughening thin glass sheets and ensures a high yield, and minimum effect on the shape and optical surface properties of the glass sheet.

When the air supply to the line 19 is switched off the bubbling peripheral region of the bed rapidly returns to the quiescent state while at the same time the central part of the bed rapidly resumes the same quiescent uniformly expanded state, which may have been slightly influenced by the peripheral bubbling of the bed.

The tank 3 is provided with a lid 22 which is shown in its open position in FIGS. 1 to 3. The closed position of the lid is also indicated at 23 in FIG. 2. This lid is usually closed during the time interval between the removal of one treated glass sheet from the fluidised bed and the lowering of the next glass sheet to be treated into the bed. The lid 22 is carried by hinge plates 24 which are fixed to a shaft 25 which is carried in trunnions 26 which are mounted on a support beam system 27 which is mounted on a massive base 28.

The lid 22 is raised and lowered by means of a cylinder 29 mounted at one end of the support beam system. At its lower end the cylinder 29 is pivoted on a pivot pin 30 mounted in a bracket 31 which is fixed to the base 28. A piston rod 32 extending from the cylinder 29 carries a fork 33 which is connected by a pivot pin to a lever 34 which is fixed to the hinge plate 24 at one side of the lid. Regulation of the supply of hydraulic fluid in known manner to the cylinder 29 is effective to raise and lower the lid. A spring motor 35, FIG. 3, connected to one end of the shaft 25 normally holds the lid 22 in its closed position 23 and the cylinder operates against the action of this spring motor to raise the lid.

Figure 4:
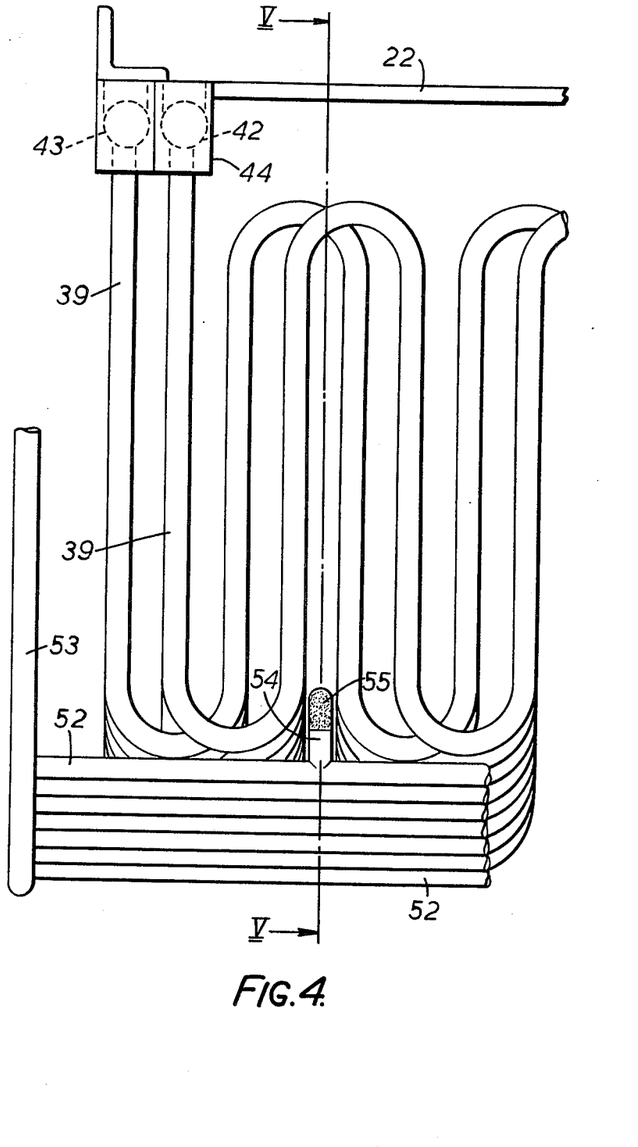
FIG. 4 is a detailed illustration of cooling pipes for lowering into the top of the fluidised bed, viewed in the direction of arrow IV of FIG. 5.
Figure 5:
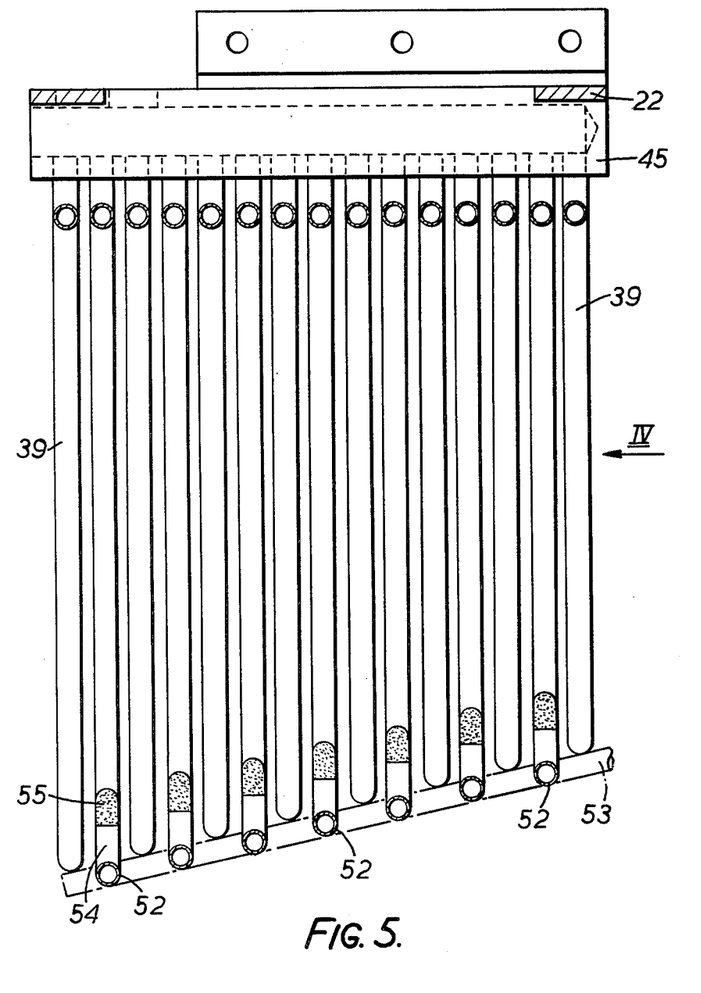
FIG. 5 is a section on line V—V of FIG. 4.

Heat is extracted from the top of the fluidised bed by circulating cooling fluid through an enclosed path in heat exchange relation with the whole of the top of the bed, while bubbling gas into the fluidised material to effect bubbling fluidisation of the top of the bed and maintaining the quiescent state of fluidisation in the lower part of the bed. This is effected by means of an array of cooling pipes carried beneath the lid 22 and arranged to be lowered into the top of the tank when the lid is lowered on to the tank. The array of cooling pipes is divided into three groups 36, 37 and 38, and each group consists of a bank of fifteen tubes, each of which is of convoluted form. As shown in FIGS. 3 and 4 the group 36 consists of tubes 39 which are staggered in that group. At one end of the lid, the left hand end in FIG. 3, there are two cooling water inlet pipes 40 and 41 which respectively supply water inlet manifolds 42 and 43 mounted in a block 44 beneath the lid. One end of each of the convoluted tubes 39 is connected to one of the inlet manifolds 42 or 43 as shown in FIG. 4. In the block 45 there are corresponding water outlet manifolds connected to the other ends of the tubes 39 of the group 36 and these manifolds in the block 45 are connected to water inlet manifolds in the block 46 to which are connected the inlet ends of convoluted cooling pipes 47 of the next group 37 of cooling pipes. The pipes 47 are constructed in the same way as the pipes 39 of group 36. Similarly these pipes 47 are connected in series with pipes 48 of the third group 38 of water cooling pipes which are also constructed in the same way as the pipes 39. The far ends of the pipes 48 are connected through manifolds in a block 49 to cooling water outlet pipes 50 and 51. In this way the flow of cooling water is arranged through the whole of the array of cooling pipes mounted beneath the lid.

Gas supply pipes 52 are carried beneath the groups 36, 37 and 38 of cooling pipes by being welded to the bottoms of the cooling pipes 39, 47 and 48. Each arrangement of gas supply pipes includes an inlet manifold 53 which supplies all the gas supply pipes 52 which have branches 54 with permeable domed caps 55 arranged in spaces between the bottoms of the convoluted cooling pipes. The outlet branches 54 with their permeable caps 55 are distributed over the whole region of the bottom of each group of cooling pipes of the array.

When a glass sheet is being immersed into the fluidised bed the top of the fluidised bed receives more heat from the glass than does the bottom of the bed. After the glass sheet has cooled in the bed and has been raised from the bed the lid 22 is lowered to its position 23 by operation of the cylinder 29 and the array of cooling pipes constituted by the groups 36, 37 and 38 are inserted, as the lid is lowered, into the top of the tank. This array of cooling pipes fits between the banks of cooling pipes 8 which extend around the inside of the side walls of the tank. At the same time as bubbling fluidisation is effected around the side walls, gas is supplied to the inlet manifolds 53 so that the whole of the top of the bed is in a state of bubbling fluidisation to facilitate cooling by heat exchange with the cooling pipes 39, 47 and 48. The quiescent state of the fluidisation in the lower part of the bed is unchanged and after the gas supplies to the manifolds 53 and to the inlet pipe 19 are switched off the quiescent state of the whole of the bed is reestablished preparatory to the lifting of the lid 22 which removes the array of cooling pipes from the top of the bed.

The top of the bed is thereby maintained at a predetermined temperature ready for receiving the next hot glass sheet to be toughened by being lowered into the fluidised bed in its quiescent uniformly expanded state of particulate fluidisation.

The use of the array of cooling tubes beneath the lid is not essential but speeds up operation of the process on mass production lines to cut down the time between toughening of successive sheets.

It is desirable to locate each of the gas supply pipes as nearly horizontal as possible to avoid transfer of fluidising gas between different locations of the fluidised bed, through the gas supply pipes when the gas supply is switched off.

Figure 6:
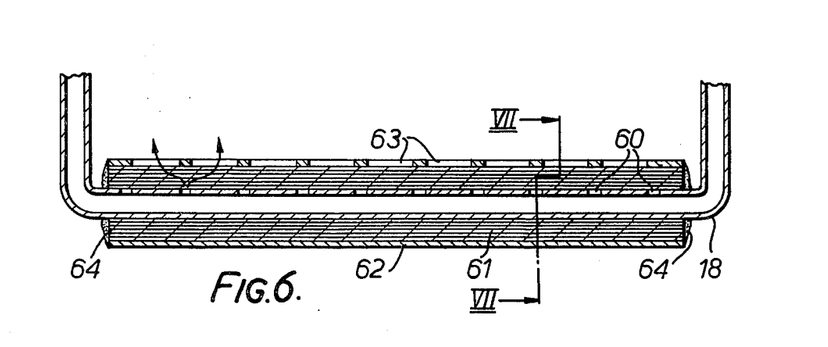
FIG. 6 is a longitudinal section through an alternative form of gas supply pipe.
Figure 7:
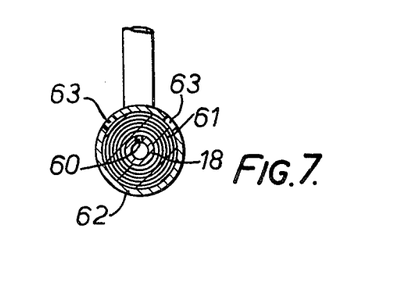
FIG. 7 is a section on line VII—VII of FIG. 6.

FIGS. 6 and 7 show an alternative form for the gas supply pipes 18 or 52 in which the tendency for gas feeds through the pipes from one part of the fluidised bed to another is avoided.

In this modification which is illustrated as a modification of one of the gas supply pipes 18, the pipe 18 has a series of air outlet holes 60 along the top of the pipe, which holes are 1.5 mm in diameter and are spaced at 50 mm intervals. The pipe 18 is wrapped with six turns of a microporous paper 61 which is about five times thicker than the paper used in construction of the membrane 6 at the bottom of the fluidised bed, and has a higher permeability than the paper of the membrane 6.

An outer tube 62 is fitted over the paper 61, and has a series of double outlet slots 63 formed along the upper part of the tube 62. The ends of the layers of paper are sealed with an epoxy resin and silicone rubber as indicated at 64. These seals extend from the ends of the outer tube 62 to the air supply pipe 18.

Gas fed through the pipe 18 is distributed uniformly through the turns of paper 61 and passes out through the double outlet slots 63 in the outer tube 62 to cause uniform bubbling of the fluidised particulate material in the region of the cooling pipes adjacent the side walls of the tank. Gas is prevented from entering the supply pipe 18 from the fluidised bed because of the low permeability of the turns of paper 61. This avoids spurious gas feed through the gas supply pipes 18 within the fluidised bed. The gas supply pipes 52 on the lid are constructed and operate in the same way.

Further cooling facility can be provided by increasing the number of vertical cooling pipes 8 which are mounted adjacent the tank side walls. This can best be done by augmenting the single banks of cooling pipes 8 which are illustrated, by one or more further banks of cooling pipes which are mounted in parallel close to the tank side walls. This would give two or even three rows of vertical cooling pipes adjacent each of the side walls of the tank containing the fluidised bed. Adequate space for the immersion of the glass sheet being processed in the central part of the fluidised bed is retained.

In one such arrangement there is a double bank of cooling pipes 8 mounted adjacent the tank side walls. Each of the banks of cooling tubes 8 has the form illustrated in FIG. 3 and, adjacent each tank side wall, the inner bank of tubes is staggered by half a pitch relative to the outer bank of tubes. Each bank may be provided with its own gas supply pipe.

The total surface cooling area of the double bank of cooling pipes is about 12 square meters. Each of the pipes has an outside diameter of 22 mm and the total length of the cooling pipes is 100 meters. The rate of flow of cooling water through the pipes is 60 liters per minute. Air is fed to the gas supply pipes 18 at a pressure of $69 \times 10^3 \text{N/m}^2$. In a cycle time of 60 seconds for the toughening of successive glass sheets the gas supply pipes are operated for 40 seconds and are switched off for 20 seconds. The time of immersion of each glass sheet in the fluidised bed is 8 seconds occurring during the middle of the 20 second period when the gas supply to the pipes 18 is switched off.

When toughening glass sheets of thickness 2.3 mm and overall size 1.5 m $\times$ 0.66 m, with the glass at an average temperature of 650° C. when it enters the fluidised bed, 55 kilowatts have to be removed from the bed in order to maintain the bed temperature at 85° C. when the glass sheets are being toughened in succession, one every 60 seconds. This rate of cooling is achieved with a rise in temperature of the cooling water from 9° C. at the inlet to 22° C. at the outlet.

The rate of heat exchange with the particulate material of the fluidised bed is governed by regulation of the rate of feed of cooling water through the cooling pipes around the tank side walls and attached to the lid, as well as by regulation of the rate of supply of bubbling air to the gas supply pipe 19 and to the inlet manifolds 53 of the gas supply means attached to the array of cooling pipes beneath the lid.

The invention can also be applied to fluidised beds for the processing of other materials for example for drying paper in continuous web form, which is passed through a heated fluidised bed, or for the processing of material in continuous ribbon form such as textile material.

I claim:

1. A method of operating a fluidised bed for use in the processing of articles which are immersed in the bed, comprising immersing the articles in a part of a gas-fluidised bed of particulate material which is maintained in a quiescent uniformly expanded state of particulate fluidisation, regulating the temperature of the fluidised bed by heat exchange within the bed with the particulate material of a localised region of the bed away from the part in which the articles are immersed, and engendering agitation within said localised region of the bed to enhance said heat exchange while maintaining said quiescent state of fluidisation of the part of the bed in which the articles are immersed.

2. A method of operating a fluidised bed for use in the processing of articles which are immersed in the bed, comprising immersing the articles in a part of a gas-fluidised bed of particulate material which is maintained in a quiescent uniformly expanded state of particulate fluidisation, regulating the temperature of the fluidised bed by heat exchange within the bed with the particulate material of a localised region of the bed away from the part in which the articles are immersed, and, between immersion of successive articles in the bed, engendering agitation within said localised region of the bed to enhance said heat exchange while maintaining said quiescent state of fluidisation of the part of the bed in which the articles are immersed.

3. A method of thermally treating a glass article, comprising immersing the article in a part of a gas-fluidised bed of particulate material which is maintained in a quiescent uniformly expanded state of particulate fluidisation, regulating the temperature of the fluidised bed by heat exchange with the particulate material in a localised region of the fluidised bed away from the part in which the articles are immersed, and, between immersion of successive articles in the bed, agitating said localised region of the fluidised bed to enhance said heat exchange while maintaning said quiescent state of fluidisation of the part of the bed in which the articles are immersed.

4. A method according to claim 3, wherein agitation of the particulate material is effected by bubbling gas into the localised region of the fluidised bed at a rate to effect localised bubbling of the particulate material in said region and thereby facilitate said heat exchange.

5. A method of thermally toughening a succession of hot glass sheets, comprising immersing the sheets in a part of a gas-fluidised bed of particulate material which is maintained in a quiescent uniformly expanded state of particulate fluidisation, circulating cooling fluid through an enclosed path in heat exchange relationship with a localised region of the fluidised bed away from the part in which the hot glass sheets are immersed, and, between immersion of successive glass sheets in the bed, engendering agitation within said localised region of the bed to enhance said heat exchange while maintaining said quiescent state of fluidisation of the part of the bed in which the sheets are immersed.

6. A method of thermally toughening a succession of hot glass sheets, comprising immersing the sheets in a gas-fluidised bed of particulate material which is maintained in a quiescent uniformly expanded state of particulate fluidisation, circulating cooling fluid through an enclosed path in heat exchange relationship with the fluidised material by circulating cooling fluid through an enclosed path at the periphery of the fluidised bed away from the central part of the bed in which the hot glass sheets are immersed, and, between immersion of successive glass sheets in the bed, engendering agitation within the bed to enhance said heat exchange by maintaining a quiescent state of fluidisation of the central part of the bed while causing localised agitation of the particulate material in the region of the enclosed path.

7. A method according to claim 6, comprising circulating cooling fluid in heat exchange relationship with the fluidised particulate material on all sides of said central part of the bed.

8. A method according to claim 7, wherein the fluidised bed is in a container of rectangular horizontal cross-section and cooling fluid is circulated through an enclosed path at each side of said cross-section to facilitate heat extraction from all sides of the fluidised bed.

9. A method of thermally treating a glass article, comprising immersing the article in a gas-fluidised bed of particulate material which is maintained in a quiescent uniformly expanded state of particulate fluidisation, regulating the temperature of the fluidised bed by heat exchange with the particulate material at least in a localised region of the fluidised bed, and, between immersion of successive articles in the bed, agitating the fluidised bed at least in that region to enhance said heat exchange, and wherein said heat exchange with the particulate material includes extracting heat from the top of the fluidised bed by circulating cooling fluid through an enclosed path in heat exchange relationship with the whole of the top of the bed, and the agitation of the fluidised bed includes causing localised agitation of material to effect an increased rapidity of particle movement and particle mixing at the top of the bed to enhance heat exchange while maintaining said quiescent state of fluidisation in the lower part of the bed.

10. A method for the thermal treatment of a succession of glass articles, comprising the steps of:
immersing each article in a part of a gas-fluidised bed of particulate material which is maintained in a quiescent uniformly expanded state of particulate fluidisation while each article is immersed;
regulating the temperature of the fluidised bed by heat exchange with the particulate material in a localised region of the fluidised bed away from the part in which the articles are immersed; and agitating the fluidised bed in said localised region during the intervals between immersion of successive articles while maintaining the quiescent state of fluidisation of the part of the bed in which the articles are immersed, to enhance said heat exchange between the immersion of successive articles.

11. Apparatus for thermally treating a glass article, comprising a tank for containing a fluidised bed of particulate material, gas supply means at the bottom of the tank for maintaining a quiescent uniformly expanded state of particulate fluidisation of the bed, heat exchange means located in the tank, and agitator means mounted in the tank adjacent the heat exchange means for maintaining localised agitation in the particulate material contacting the heat exchange means.

12. Apparatus according to claim 11, for the thermal toughening of flat or bent glass sheets, wherein the tank is of rectangular horizontal cross-section, the heat exchange means comprises at least one bank of cooling pipes mounted in the tank adjacent a wall of the tank, and the agitator means comprises gas supply means in the region of the bottom of the bank of cooling pipes.

13. Apparatus according to claim 12, comprising a plurality of banks of cooling pipes which are respectively adjacent the walls of the tank, with a gas supply pipe in the region of the bottom of each bank of cooling pipes.

14. Apparatus according to claim 11, wherein the heat exchange means includes an array of cooling pipes arranged to be lowered into the top of the tank, and the gas supply means comprises gas supply pipes carried by the heat exchange means at the bottom of the array of cooling pipes and having outlets distributed over the whole region of the bottom of the array.

15. Apparatus according to claim 14, wherein the array of cooling pipes is carried beneath a lid for the tank, which lid is pivotally mounted for lowering onto the top of the tank thereby inserting the array of cooling pipes into the tank.

* * * * *